Patented Mar. 15, 1932

1,849,587

UNITED STATES PATENT OFFICE

GEORG OSTERTAG, OF BASEL, SWITZERLAND, ASSIGNOR TO THE FIRM DURAND & HUGUENIN S. A., OF BASEL, SWITZERLAND

MORDANT DYESTUFFS AND PROCESS OF MAKING SAME

No Drawing. Application filed December 29, 1927, Serial No. 243,476, and in Germany January 10, 1927.

I have found that valuable mordant dyestuffs can be obtained by diazotizing an amino body of the following general formula:

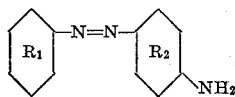

wherein $R_1$ represents a benzene nucleus containing a hydroxyl and carboxyl group in ortho position to each other and $R_2$ represents a benezene or naphthalene nucleus which apart from the amino group in para position to the azo group, may contain as further substituent many other position sulpho groups, and by treating the diazo compound thus obtained in an acidified watery suspension, preferably in a weak hydrochloric acid suspension at a raised temperature. In practice the best way is to work at the boil. By this treatment the diazo compound gradually loses its coupling power. The reaction is terminated, when the coupling power has disappeared, that is to say, when a test, to which some ammonia has been added, does no more show a blue coloration or does no more react upon an azo coupling component such as resorcinol-or β-naphthol-3:6-disulphonic acid. For instance, the aminoazo dyestuff: 4-amino-2-sulpho-benzene-azosalicylic acid

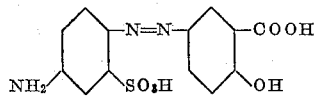

can be diazotized and the resulting diazo compound treated in an acidified watery suspension at boiling temperature until its power of coupling has disappeared.

In "Chemistry and Technology of the Diazo Compounds," pages 36 to 41 incl. (1920), Cain describes in Chapter IV "The reactions of diazo compounds" the action of water on diazonium salts. In this reaction, which is best carried out in the presence of sulphuric acid, the diazo group is split off in the form of nitrogen and a hydroxyl group takes its place, so that one obtains according to the starting materials chosen, more or less easy hydroxy-compounds. Unexpectedly it has been found, that in subjecting starting materials of the above mentioned structure, that is to say, a diazotized amino-azo-compound (with a free amino group in para-position to the azo group) to the herein described process, instead of phenols, new bodies of valuable dyeing properties are resulting.

It has not yet been found exactly what happens to the diazo body in this treatment with acid. It seems that the reaction does not consist in a simple substitution of the diazo groups by hydroxyl, but is of a more complicated nature and that the resulting azo dyestuffs besides the nitrogen being present in the azo groups, contain more nitrogen, but not in form of a chromophoric group. It seems that the dyestuffs of the present invention are similar to those of my co-pending application Ser. No. 243,475, filed December 29, 1927. But the identity of these dyestuffs can not be stated, because there are certain differences with respect to their shades and reaction in concentrated sulphuric acid.

The dyestuffs thus obtained constitute brown powders, being in form of their alkali metal salts soluble in water with brown colour, which solution on the addition of caustic soda lye turns to brown red and from which solution an addition of diluted hydrochloric acid separates out black flakes, said dyestuffs dissolving in concentrated sulphuric acid to a reddish-brown solution and dyeing chromium mordanted fibre fast mainly brown shades.

The new process is illustrated by the following examples, the parts being by weight:

*Example 1*

337 parts of 4-amino-2-sulphobenzene-azosalicylic acid (obtained for instance by coupling the diazo compound of para-nitraniline-ortho-sulphonic acid with salicylic acid and reducing the nitro group in the monoazo dyestuff) having the formula:

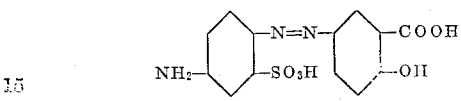

are diazotized in the usual manner the diazotation taking place at the amino group. The diazo compound, which constitutes a mass of brownish-yellow crystals, is filtered off, suspended in water and acidified with hydrochloric acid and boiled until a test to which some ammonia has been added, does no more show a blue coloration. The dyestuff which is formed is filtered off and dried. When printed with a chrome mordant on cotton it yields fast brown tones which are somewhat more yellowish than those produced by the corresponding body obtained by an alkaline treatment of the diazo compound.

*Example 2*

In a quite similar manner the aminoazo compond having the formula:

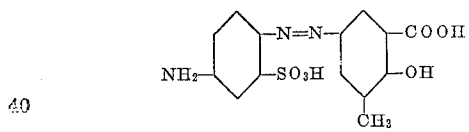

and which can be prepared for instance from diazotized para-nitraniline-sulphonic acid and ortho-cresotinic acid and by reduction of the nitro group in the monoazo dyestuff thus obtained or by combination of diazotized acetyl-para-phenylenediamine-sulphonic acid with ortho-cresotinic acid and saponification of the acetyl group, is diazotized at its amino group and the acidified watery suspension of the diazo compound thus obtained is boiled until the development of nitrogen gas has ceased and until a test to which some ammonia has been added does no more show a blue coloration. The dyestuff is completely precipitated by addition of common salt and filtered off. When printed with chrome mordant on cotton, fast brownish tints are obtained.

*Example 3*

An aminoazo compound can be obtained in a known manner by combination of diazotized para-amino-salicylic acid with Cleve-acid (α-naphthylamine-6 or 7-sulphonic acid). This body which has the formula:

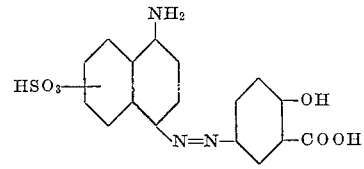

is further diazotized at its amino group and the diazo compound thus obtained suspended in water, thereupon acidified with hydrochloric acid and boiled until the development of nitrogen gas has ceased. The dyestuff is completely precipitated by addition of common salt, filtered off and dried. When printed with chrome mordant, it yields fast brown tints. In these examples instead of hydrochloric acid solution any other suitable acid acting agent may be used, such as sulphuric acid for example.

What I claim is:—

1. A process for the manufacture of mordant dyestuffs, which consists in diazotizing an aminoazo compound corresponding to the following formula:

$$R_1.N=N.R_2.NH_2,$$

wherein $R_1$ represents a benzene nucleus containing a hydroxyl and a carboxyl group in ortho position to each other and wherein $R_2$ represents a benzene or naphthalene nucleus containing an amino group in para position with respect to the azo group, and further treating the thus formed diazo compound in an acidified watery suspension so as to produce, when its coupling power has disappeared, a new azo dyestuff containing probably besides the nitrogen being present in the azo groups, more nitrogen, but not in form of a chromophoric group.

2. A process for the manufacture of mordant dyestuffs, which consists in diazotizing an aminoazo compound corresponding to the following formula:

$$R_1.N=N.R_2.NH_2,$$

wherein $R_1$ represents a benzene nucleus containing a hydroxyl and a carboxyl group in ortho position to each other and wherein $R_2$ represents a benzene or naphthalene nucleus which has an amino group in para position with respect to the azo group and which may be further substituted in any other position by sulpho groups and further treating the thus formed diazo compound in an acidified watery suspension, so as to produce, when its coupling power has disappeared, a new azo dyestuff containing probably besides the nitrogen being present in the azo groups, more nitrogen, but not in form of a chromophoric group.

3. A process for the manufacture of mordant dyestuffs, which consists in diazotizing an aminoazo compound, corresponding to the following formula:

$$R_1.N=N.R_2.NH_2,$$

wherein $R_1$ represents a benzene nucleus containing a hydroxyl and a carboxyl group in ortho position to each other and wherein $R_2$ represents a benzene or naphthalene nucleus containing an amino group in para position with repect to the azo group and further treating the thus formed diazo compound in an acidified watery suspension at any temperature between the ordinary one and the boiling point, so as to produce, when its coupling power has disappeared, a new azo dyestuff, containing probably besides the nitrogen being present in the azo groups, more nitrogen, but not in form of a chromophoric group.

4. A process for the manufacture of mordant dyestuffs, which consists in diazotizing an aminoazo compound corresponding to the following formula:

$$R_1.N=N.R_2.NH_2,$$

wherein $R_1$ represents a benzene nucleus containing a hydroxyl and a carboxyl group in ortho position to each other and wherein $R_2$ represents a benzene or naphthalene nucleus which has an amino group in para position with respect to the azo group and which may be further substituted in any other position by sulpho groups and further treating the thus formed diazo compound in an acidified watery suspension at any temperature between the ordinary one and the boiling point, so as to produce, when its coupling power has disappeared, a new azo dyestuff containing probably besides the nitrogen being present in the azo groups, more nitrogen, but not in form of a chromophoric group.

5. A process for the manufacture of mordant dyestuffs, which consists in diazotizing para-amino-sulpho-benzene-azo-salicylic acid and further treating the thus formed diazo compound in an acidified watery suspension at the boil, so as to produce, when its coupling power has disappeared, a new azo dyestuff containing probably besides the nitrogen being present in the azo groups, more nitrogen, but not in form of a chromophoric group.

6. A process for the manufacture of mordant dyestuffs, which consists in diazotizing para-amino-sulpho-benzene-azo-salicylic acid and further treating the thus formed diazo compound with a hydrochloric acid solution at the boil, so as to produce, when its coupling power has disappeared, a new azo dyestuff containing probably besides the nitrogen being present in the azo groups, more nitrogen, but not in form of a chromophoric group.

7. As new articles of manufacture the herein described mordant dyestuffs obtained by diazotizing an aminoazo compound corresponding to the following formula:

$$R_1.N=N.R_2.NH_2,$$

wherein $R_1$ represents a benzene nucleus having a hydroxyl and a carboxyl group in ortho position to each other and wherein $R_2$ represents a benzene or naphthalene nucleus having an amino group in para position with respect to the azo group, and by further treating the thus formed diazo compound in an acidified watery suspension, said dyestuffs constituting brown powders, being in form of their alkali metal salts soluble in water with brown colour, which solution on the addition of caustic soda lye turns to brown red and from which solution an addition of diluted hydrochloric acid separates out black flakes, said dyestuffs dissolving in concentrated sulphuric acid to a reddish brown solution and dyeing chromium mordanted fibre fast mainly brown shades.

8. As new articles of manufacture the herein described mordant dyestuffs obtained by diazotizing an aminoazo compound corresponding to the following formula:

$$R_1.N=N.R_2.NH_2,$$

wherein $R_1$ represents a benzene nucleus having a hydrozyl and a carboxyl group in ortho position to each other, and wherein $R_2$ represents a benzene or naphthalene nucleus which has an amino group in para position with respect to the azo group and which may be further substituted in any other position by sulpho groups, and by further treating the thus formed diazo compound in an acidified watery suspension, said dyestuffs constituting brown powders, being in form of their alkali metal salts soluble in water with brown colour, which solution on the addition of caustic soda lye turns to brown red and from which solution an addition of diluted hydrochloric acid separates out black flakes, said dyestuffs dissolving in concentrated sulphuric acid to a reddish brown solution and dyeing chromium mordanted fibre fast mainly brown shades.

9. As new articles of manufacture the herein described mordant dyestuffs, obtained by diazotizing an aminoazo compound corresponding to the following formula:

$$R_1.N=N.R_2.NH_2,$$

wherein $R_1$ represents a benzene nucleus having a hydroxyl and a carboxyl group in ortho position to each other, and wherein $R_2$ represents a benzene or naphthalene nucleus having an amino group in para position with respect to the azo group and by further treating the thus formed diazo compound in an acidified watery suspension at any temperature between the ordinary one and the boiling point, said dyestuffs constituting brown powders, being in form of their alkali metal salts soluble in water with brown colour, which solution on the addition of caustic soda lye turns to brown red and from which solution an addition of diluted hydrochloric acid separates out black flakes, said dyestuffs dissolving in concentrated sulphuric acid to a reddish brown solution and dyeing chromium mordanted fibre fast mainly brown shades.

10. As new articles of manufacture the herein described mordant dyestuffs, obtained by diazotizing an aminoazo compound corresponding to the following formula:

$$R_1.N=N.R_2.NH_2,$$

wherein $R_1$ represents a benzene nucleus having a hydrogen and a carboxyl group in ortho position to each other and wherein $R_2$ represents a benzene or naphthalene nucleus which has an amino group in para position with respect to the azo group and which may be further substituted in any other position by sulpho groups, and by further treating the thus formed diazo compound in an acidified watery suspension at any temperature between the ordinary one and the boiling point, said dyestuffs constituting brown powders, being in form of their alkali metal salts, soluble in water with brown colour, which solution on the addition of caustic soda lye turns to brown red and from which solution an addition of diluted hydrochloric acid separates out black flakes, said dyestuffs dissolving in concentrated sulphuric acid to a reddish brown solution and dyeing chromium mordanted fibre fast mainly brown shades.

11. As new article of manufacture the herein described mordant dyestuff, obtained by diazotizing para-amino-sulpho-benzene-azo-salicylic acid and by further treating the thus formed diazo compound in an acidified watery suspension at the boil, said dyestuff constituting a brown powder, being in form of its alkali metal salts soluble in water with brown colour, which solution on the addition of caustic soda lye turns to brown red and from which solution an addition of diluted hydrochloric acid separates out black flakes, said dyestuff dissolving in concentrated sulphuric acid to a reddish brown solution and dyeing chromium mordanted fibre fast brown shades.

In witness whereof I have hereunto signed my name this 19th day of December, 1927.

GEORG OSTERTAG.